United States Patent

Schimitschek

[15] 3,654,568
[45] Apr. 4, 1972

[54] ROTATING LIQUID-COOLED LIQUID LASER CELL

[72] Inventor: Erhard J. Schimitschek, Garching, Munich, Germany

[73] Assignee: The United States of America as represented by the Secretary of the Navy

[22] Filed: Jan. 29, 1971

[21] Appl. No.: 110,904

[52] U.S. Cl. .................................................. 331/94.5
[51] Int. Cl. ..................... H01s 3/04, H01s 3/09, H01s 3/20
[58] Field of Search ................................................ 331/94.5

[56] References Cited

UNITED STATES PATENTS

| | | | |
|---|---|---|---|
| 3,311,844 | 3/1967 | Di Curcio | 331/94.5 |
| 3,451,007 | 6/1969 | Schimitschek et al. | 331/94.5 |
| 3,521,190 | 7/1970 | Schimitschek et al. | 331/94.5 |
| 3,541,469 | 11/1970 | Schimitschek et al. | 331/94.5 |
| 3,560,872 | 2/1971 | Heimann | 331/94.5 |

Primary Examiner—Ronald L. Wibert
Assistant Examiner—Edward S. Bauer
Attorney—R. S. Sciascia, G. J. Rubens and J. W. McLaren

[57] ABSTRACT

A liquid laser assembly for receiving a liquid laser composition is rotatably driven while being cooled by a surrounding liquid medium. A liquid laser composition is contained within the annular volume between inner and outer concentric cylinders and enclosing end walls. The rotatable assembly is mounted and supported within an enclosure and has a member extending through an enclosure wall for being driven by an appropriate drive means. A liquid cooling medium which surrounds the annular volume containing the liquid laser composition is circulated in and out of the enclosure through appropriate input and output ports for flow through a heat exchanger and circulating pump. The improved cooling of the liquid laser composition realized without circulating the laser composition itself significantly increases and enhances the efficiency of the laser operation.

6 Claims, 2 Drawing Figures

INVENTOR.
ERHARD J. SCHIMITSCHEK
JOHN A. TRIAS

ATTORNEYS

ROTATING LIQUID-COOLED LIQUID LASER CELL

STATEMENT OF GOVERNMENT INTEREST

The invention described herein may be manufactured and used by or for the Government of the United States of America for governmental purposes without the payment of any royalties thereon or therefor.

CROSS REFERENCES TO RELATED APPLICATIONS

The subject matter in the present application is generally related to that of U.S. Pat. No. 3,451,007, titled Liquid Laser Cell, issued June 17, 1969, in the names of Erhard J. Schimitschek and Edward R. Schumacher and U.S. Pat. No. 3,521,190, titled Liquid Lens Liquid Laser Cell, issued July 21, 1970 in the names of Erhard J. Schimitschek, Edward R. Schumacher, and Cory G. Cook, and pending U.S. Pat. application Ser. No. 656,628, and now U.S. Pat. No. 3,541,469, titled Adjustable Recirculating Liquid Lens Laser Cell filed July 25, 1967 in the names of Erhard J. Schimitschek, Richard B. Nehrich, Jr., and Edward R. Schumacher all of which are exemplary of prior art types of liquid laser assemblies.

BACKGROUND OF THE INVENTION

Since the advent of the successful operation of liquid lasers it has been realized and generally accepted by those skilled and knowledgeable in the pertinent arts that the general overall efficiency of liquid lasers can be improved and enhanced if the liquid is maintained at a predetermined desirable temperature. More particularly, such parameters as the pulse rate, in the case of pulsed lasers, can be optimized to provide a high duty cycle when appropriate cooling of the liquid laser composition is effected. Whether or not a liquid laser if of the pulsed type, however, it has been found that improved efficiency and performance will result if an optimum temperature of the liquid laser composition is maintained. Obviously the great exchange of energy develops considerable amounts of heat which ordinarily would be absorbed in a liquid laser composition if some effective means were not employed to maintain the liquid laser composition at a desired temperature.

In some prior art techniques such as that employed in the pending U.S. Pat. application Ser. No. 656,628 previously referenced, the liquid lasing composition itself is circulated under the pressure of an appropriate pumping means and cooled in a suitable heat exchanger before being returned to the site where it is re-energized to raise it to a lasing level again. Such cooling techniques, however, involve the physical recirculation of the liquid laser composition itself and, while giving effect to the desired result of cooling the liquid laser composition, other undesirable results may be introduced such as excessive turbulence, thermal gradients, contamination by passage through the moving parts of a mechanically driven pump, etc., any of which may give rise to detrimental effects on the overall performance of the liquid laser composition and the laser assembly configuration in which it is employed.

It is against this general background of prior art practices and techniques that the present invention was conceived to obviate some of the disadvantages which were inherent in prior art practices.

SUMMARY OF THE INVENTION

The present invention was conceived to provide highly efficient cooling of a liquid laser composition without recirculating the liquid laser composition itself through a pump circulatory path and a heat exchanger. Accordingly, some inherent disadvantages of the prior art are overcome by employing the teaching and concept of the present invention while highly efficient cooling is given affect to optimize and enhance he efficiency of the liquid laser composition in its emission of the desired radiation.

The present invention conceives a rotating, liquid-cooled laser assembly for receiving an appropriate liquid laser composition and disposing that liquid laser composition to an appropriate laser excitation source while maintaining the temperature of the liquid laser composition at a predetermined desirable temperature. These highly desirable results are achieved without recirculation of the liquid laser composition itself.

The liquid laser assembly of the present invention includes inner and outer concentric cylinders of an appropriate material such as quartz, for example, which have end walls disposed at their extremities to form an enclosed annular volume for receiving a liquid laser composition.

An outer enclosure, which may be of larger cylindrical shape, for example, is configured to receive the enclosed annular assembly comprising the two concentric cylinders with annular end walls therebetween, and appropriate means is provided for rotatably supporting the enclosed annular assembly within the larger enclosure. This means may, for example, include a central axial member secured to the enclosed annular assembly and mounted in appropriate bearings disposed in the end walls of the outer enclosure so as to have a portion, such as an axial member of the rotatable supporting means extending through an end wall to provide a convenient means for driving the rotatably supported enclosed annular assembly containing the liquid laser composition. Such drive means may comprise a suitable electric motor, for example, preferably connected through a flexible drive connection to reduce and minimize vibrations.

The outer enclosure is fitted with input and output ports. The input port receives a cooling liquid into the outer enclosure for surrounding the enclosed annular assembly which contains the liquid laser composition. The output port discharges the liquid circulated about the enclosed annular assembly for flow to a heat exchanger which cools and circulates the liquid.

Accordingly, the liquid which is cooled and circulated is not the liquid laser composition but a fluid of suitable predetermined optical and heat conduction properties which surrounds the enclosed annular assembly containing the liquid laser composition. Since the enclosed annular assembly is being driven rotatably while completely immersed in a cooling liquid, and the surrounding cooling liquid is being circulated through an external heat exchange and pump means, the liquid laser composition is constantly maintained at a predetermined desirable temperature to give effect to the optimal operation and efficiency of the liquid laser composition.

The outer enclosure includes an aperture, preferably disposed lengthwise with respect to its cylindrical axis, and a source of laser excitation energy which is supported adjacent to that aperture for transmitting laser excitation energy to the liquid laser composition through the surrounding cooling liquid which preferably is of a character to provide maximal cooling and minimal energy absorption. The laser excitation energy thus transmitted passes through the outer concentric cylinder of the annular assembly which encloses the liquid laser composition.

The outer concentric cylinder is preferably fabricated of a material, such as quartz, having desirably minimal absorption characteristics. The inner concentric cylinder of the enclosed annular assembly containing the liquid laser composition need not be of light transmissive material but, on the contrary, is preferably highly reflective and may, for example, be gold-plated to enhance the reflection of the laser excitation energy back through the liquid laser composition to thereby improve and optimize the output of laser energy.

The laser energy which is thus produced in a lengthwise section or portion of the annular assembly enclosing the liquid laser composition is emitted through appropriate windows positioned in the outer enclosure so as to be aligned with that portion of the enclosed annular assembly which is exposed to the excitation energy. The laser emission if transmitted through one or two windows in the end walls of the outer enclosure and in a preferred embodiment of the present invention two mirrors may be disposed outside the outer enclosure, one adjacent each of the windows of the end wall where laser energy passes through. One of these mirrors is preferably totally reflective and the other only partially reflective so as to reflect a predetermined amount of laser energy back into the liquid laser composition enclosed within the annular assembly and thereby enhance its output of maximum power and energy.

Accordingly, it is a most important object of the present invention to provide a liquid laser assembly capable of significantly improved cooling properties to enhance the emission of laser energy and power.

Another most important object of the present invention is to provide such improved cooling of a liquid laser assembly without circulating the liquid laser composition through a heat exchange device.

Yet another important object of the present invention is to provide such a liquid laser assembly which exposes different discrete portions of the liquid laser composition to successive excitation without circulating the liquid laser composition through an external fluid path.

A further object of the present invention is to provide a liquid laser assembly which will readily accommodate liquid laser composition in an amount sufficient for successive discrete excitation by a laser excitation source.

Another object of the present invention is to provide a liquid laser assembly having a maximal amount of area exposed to a surrounding cooling medium.

These and other features, advantages and objects of the present invention will be better appreciated from an understanding of a preferred embodiment of the new liquid laser assembly as disclosed in the following description and illustrated in the drawings.

DESCRIPTION OF THE PREFERRED EMBODIMENT

Figure 1:
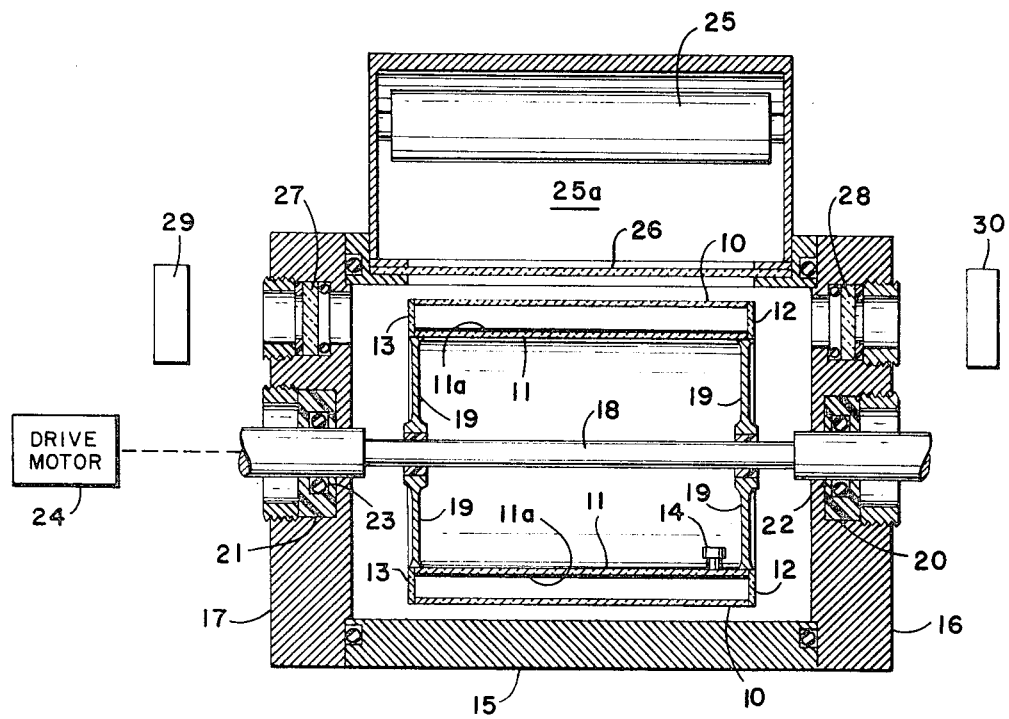
FIGS. 1 and 2 are partially cross-sectional side and end views, respectively, of a preferred embodiment of the present invention.

FIG. 1 is a partially cross-sectional side view of a preferred embodiment of the present invention. An outer cylindrical member 10, preferably fabricated of a desirably light transmissive material, such as quartz, for example, is disposed in concentric relationship with respect to an inner cylindrical member 11. Annular end walls 12 and 13 are secured at either end of the two concentric cylindrical members 10 and 11 to form an enclosed annular assembly defining an annular volumetric space between the two cylindrical walls 10 and 11 for receiving liquid laser composition. A port 14 is provided on the inner cylindrical wall 11 for the purpose of admitting or changing the liquid laser composition to be employed in the assembly of the present invention. The inner cylindrical wall 11 need not be of light transmissive material and preferably will have a highly reflective coating on its outer surface as indicated at 11a, such as a film of gold-plating, for example.

The described enclosed annular assembly is positioned and supported within an outer enclosure which may comprise a cylindrical member 15 and end wall members 16 and 17 as illustrated in FIG. 1. The enclosed annular assembly, comprising inner and outer concentric cylinders 11 and 10, respectively, together with the annular end walls 12 and 13, is suitably mounted on a central axial shaft 18 and supported in spaced concentric relation with respect thereto by the spoke-like members 19 which are suitably secured to and disposed about the axial shaft 18. The axial shaft 18 extends through the end wall 17 of the outer enclosure so that the enclosed annular assembly within the outer enclosure 17 may be rotatably driven. The axial shaft 18 is suitably supported by bearing members 20 and 21 which include O-rings 22 and 23, respectively, for sealing and retaining fluid within the outer enclosure. The axial shaft 18 is mechanically connected, preferably by a flexible coupling or other suitable means, to the driving means which may take the form of a drive motor 24 as schematically indicated in FIG. 1.

A suitable source of laser excitation energy, which may take the form of a flash lamp such as that indicated at 25, is suitably supported within a highly reflective enclosure 25a adjacent the cylindrical member 15 of the outer enclosure. A fluid tight aperture 26 is provided in the cylindrical member 15 of the outer enclosure to admit laser excitation energy emanating from the source 25. The aperture 26 is, of course, arranged to be adjacent to, and in alignment with, the enclosed annular assembly supported within the outer enclosure.

At least one window, and preferably two windows such as are indicated at 27 and 28, are positioned in the end walls 17 and 16, respectively, of the outer enclosure for transmitting laser emission therethrough. Windows 27 and 28 are sealed with O-rings to make them fluid-tight and are also aligned with the enclosed annular assembly within the outer enclosure from which the laser emission emanates.

In a preferred embodiment, as illustrated by FIG. 1, two reflective elements 29 and 30 are positioned and supported external of the windows 27 and 28 and in alignment therewith. For efficient operation and enhancement of the laser emission emanating from the enclosed annular assembly it has been found desirable that one of the reflective means, such as 30 be totally reflective for reflecting all the laser emission emanating from the window 28 back into the enclosed annular assembly; preferably, the other reflective means 29 is partially reflective for reflecting a portion of the laser emission back into the enclosed annular assembly, while passing the remainder of the laser emission through the reflective means 29 to be employed as desired.

As is well known in the laser art, the continuous and repeated reflection of laser emission back into the liquid laser composition whence the laser emission has emanated and originated, enhances its operation and enables it to develop more energy and power.

Figure 2:
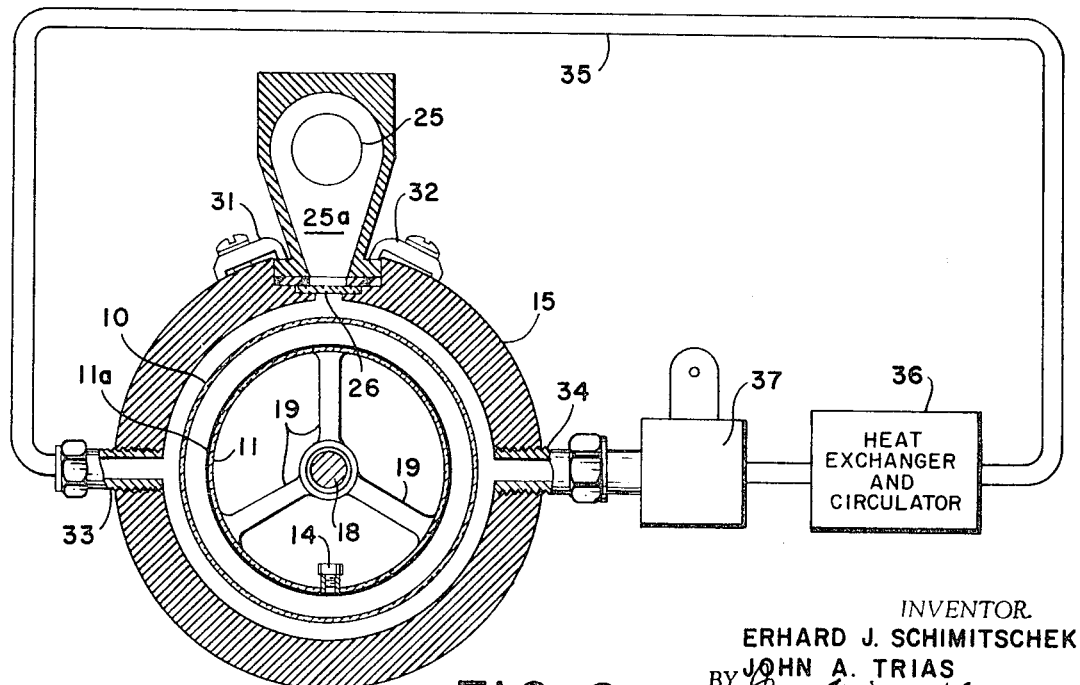

FIG. 2 is a partially cross-sectional end view of the preferred embodiment illustrated in FIG. 1. In FIG. 2 like elements of the structure are indicated by the same numerical designation as in FIG. 1. FIG. 2 illustrates in a cross-sectional fashion the manner in which the source of laser excitation energy 25 is suitably supported and positioned by a securing means such as the clamp and screw assemblies 31 and 32 so as to reflectively direct the laser excitation energy emanating from the source 25 through the window 26 for transmission to the enclosed annular assembly comprising the concentric cylindrical members 10 and 11 wherein the liquid laser composition is contained.

The illustration of FIG. 2 also explicitly depicts the manner in which the enclosed annular assembly containing a liquid laser composition is rotatably supported within the cylindrical member of the 15 of the outside enclosure by means of the spoke-like members 19 secured and disposed from the central axial shaft 18 to the inner concentric cylinder 11.

Inlet and outlet ports 33 and 34, respectively, are connected to a continuous fluid path 35 which also includes a heat exchanger and circulator 36 and a valve control means 37. Fluid communication is thus afforded from the inside of the outer enclosure comprising the cylinder member 15 and end walls 16 and 17 to the external components such as the heat exchanger and circulator 36 which performs the function of cooling and circulating a selected cooling fluid which, in turn, maintains the liquid laser composition within the enclosed annular assembly at a stable, desired temperature as that assembly is rotatably driven by the drive motor 24 as illustrated in FIG. 1.

OPERATION

In the preferred manner of operation the following outlined procedure may be followed. Firstly, an end wall such as that illustrated at 16 in FIG. 1 will be removed for withdrawal of the enclosed annular assembly comprising the inner and outer concentric cylinders 11 and 10, respectively, as well as the annular end walls 12 and 13 together with the supporting members 19 and the axial shaft 18. A suitable, selected liquid laser composition is introduced into the annular volumetric space formed by the foregoing concentric cylinders and annular end walls and, when filled, the port 14 is capped. The enclosed annular assembly containing the liquid laser composition is then replaced within the outer enclosure comprising the cylinder 15 and the end wall 17. When the enclosed annular assembly has been replaced and correctly positioned, the end wall 16 is repositioned to receive the end of the axial shaft 18 in bearing support and secured in a fluid-tight manner by appropriate means, such as bolts or studs and nuts (not shown) to produce suitable compressive forces to render the shown O-rings pressure tight.

An appropriate, selected cooling medium, preferably a fluid having good heat conduction qualities is introduced to the continuous path 35 through the valve means 37, as shown in FIG. 2. The heat exchanger and circulator 36 is then actuated so as to circulate the fluid cooling medium throughout the continuous fluid path 35, into the inlet port 33, about, around, and completely surrounding and immersing the enclosed annular assembly rotatably supported within the outer enclosure 15 and discharged through the outlet port 34.

Thus, the entire fluid circuit is filled with the fluid cooling medium for effective cooling of the liquid laser composition by intimate contact with the two cylindrical walls 10 and 11 and the annular end walls 12 and 13, as well. The drive motor 24 as shown in FIG. 1 may then be actuated to rotatably drive the enclosed annular assembly at a predetermined desired speed for most efficient cooling and effective laser excitation. The source of laser excitation energy 25 is then energized by a suitable source such as an electrical source for example, (not shown) and the laser excitation energy which emanates from the source 25 is reflectively directed through the aperture 26 onto a lengthwise portion of the enclosed annular assembly as it is being rotatably driven.

Thus if, for example, a suitable flash lamp is employed as the laser excitation energy source 25, discrete and different successive portions of the liquid laser composition contained within the enclosed annular assembly are excited and raised to a lasing level as the enclosed annular assembly is being rotatably driven. This in and of itself initially contributes to maintaining the liquid laser composition at the desirable temperature since only a portion of the liquid laser composition is being excited at any one given time and the remainder of the liquid laser composition is thus in a non-excited state and at that lower energy level does not generate as much heat, contributing to stabilization of the temperature. As the enclosed annular assembly is rotatably driven, it is constantly in direct contact through its inner and outer cylinder walls 10 and 11 as well as its annular end walls with the fluid cooling medium which is continuously being circulated through the fluid path 35 for external cooling through the heat exchanger 36.

Accordingly, the present invention contemplates the cooling of a liquid laser composition by providing that the liquid laser composition is exposed to the laser excitation energy in successively different portions and at successively different times as well as being in intimate direct physical contact with a cooling medium which is continuously circulated about the enclosed annular assembly and cooled externally. Accordingly, actual circulation of the liquid laser composition is obviated, eliminating some of the inherent disadvantages and deficiencies of several prior art techniques. This, in turn, eliminates excessive turbulence in the liquid laser composition itself as well as thermal gradients which may occur to the detriment of the overall laser operation.

Highly important, as a contributory factor in the desired cooling results produced by the teaching of the present invention, is the fact that the amount of liquid laser composition which is employed in a liquid laser assembly embodying the concept of the present invention may be selectively varied as desired by the choice of different volumes of annular space in employing enclosed annular assemblies of different dimensions, particularly as relates to the diameters of the inner and outer concentric cylindrical members.

This feature, coupled with the fact that only a relatively small lengthwise portion of the liquid laser composition is being energized at any given time, affords a wide choice of operating parameters through the selective variation of both the speed of rotation and the size of the enclosed annular assembly so that any of numerous selectable amounts of liquid laser composition may be energized as desired in a particular application.

Obviously many modifications and variations of the present invention are possible in the light of the above teachings. It is therefore to be understood that within the scope of the appended claims the invention may be practiced otherwise than as specifically described.

What is claimed is:

1. A liquid laser assembly comprising:
   inner and outer concentric cylinders having annular end walls secured therebetween forming an enclosed annular assembly for receiving a liquid laser composition,
   said outer cylinder being of light transmissive material;
   an outer enclosure configured for receiving said enclosed annular assembly;
   means for rotatably supporting said enclosed annular assembly within said outer enclosure,
   said means having a member extending through said enclosure for rotatably driving said enclosed annular assembly;
   a drive means connected to said member;
   an input port for receiving liquid into said enclosure and surrounding said enclosed annular assembly;
   an output port for discharging liquid circulated about said enclosed annular assembly;
   heat exchanger means connected to said input and output ports for cooling and circulating said liquid;
   a source of laser excitation energy supported adjacent a wall of said enclosure;
   an aperture in said enclosure for admitting said laser excitation energy therethrough; and
   a window in said enclosure aligned with said enclosed annular assembly for transmitting laser emission therethrough.

2. A liquid laser assembly as claimed in claim 1 wherein the outermost cylindrical surface of said inner concentric cylinder has a highly reflective coating.

3. A liquid laser assembly as claimed in claim 2 wherein said highly reflective coating is gold.

4. A liquid laser assembly as claimed in claim 1 and including:
   a second window oppositely disposed relative to said window in said enclosure for transmitting laser emission therethrough; and
   a reflective means supported adjacent each of said windows, one of said reflective means being totally reflective for reflecting all laser emission back into said enclosed annular assembly and the other being partially reflective for reflecting part of said laser emission back into said enclosed annular assembly and passing the remainder of said laser emission therethrough.

5. A liquid laser assembly as claimed in claim 1 wherein said enclosed annular assembly includes a port for admitting and removing different liquid laser compositions.

6. A liquid laser assembly as claimed in claim 1 wherein said liquid circulated about said enclosed annular assembly has desired predetermined optical characteristics for the optimal transmission of said laser excitation energy.

* * * * *